United States Patent [19]

Saunders

[11] Patent Number: 4,805,956
[45] Date of Patent: Feb. 21, 1989

[54] CONVERTIBLE PICKUP TRUCK

[76] Inventor: Charles L. Saunders, 2595 Sherwood, Apt. #4, Las Vegas, Nev. 89109

[21] Appl. No.: 61,407

[22] Filed: Jun. 15, 1987

[51] Int. Cl.$^4$ .............................................. B60J 7/043
[52] U.S. Cl. .................................... 296/107; 296/103; 296/216
[58] Field of Search ............... 296/103, 107, 124, 125, 296/128, 210, 216, 218, 147, 3, 10; 224/273, 42.32, 42.42, 42.45, 42.46

[56] References Cited

U.S. PATENT DOCUMENTS

| 1,819,545 | 8/1931 | Delp | 296/66 X |
| 1,956,616 | 5/1934 | Holtom | 296/107 |
| 2,382,635 | 8/1945 | Humer | 296/107 |
| 4,595,230 | 6/1986 | Fettes | 296/102 |
| 4,679,847 | 7/1987 | Dirck | 296/218 |

FOREIGN PATENT DOCUMENTS 748011  6/1933  France ................................ 296/107

Primary Examiner—Robert B. Reeves
Assistant Examiner—Russell D. Stormer
Attorney, Agent, or Firm—Neal J. Mosely

[57] ABSTRACT

A convertible pickup truck has the lower cab portion and a bed portion with a convertible cab top pivotally mounted on the lower cab portion which is movable between a raised position covering the lower cab portion and a stored position within the bed behind the front wall of the bed. The cab top is releasably secured to the windshield frame in the raised position and has a roof portion extending from the windshield rearwardly and downwardly over the lower cab portion and is pivotally attached to the rear wall of the lower cab portion. Latch members at the rear portion of the cab top and the lower cab portion releasably secure the cab top to the lower cab portion in the raised position. Resilient seals between the lower cab portion, the cab top, and the windshield form a weather-tight seal between the abutting surfaces of the members in the raised position.

7 Claims, 2 Drawing Sheets

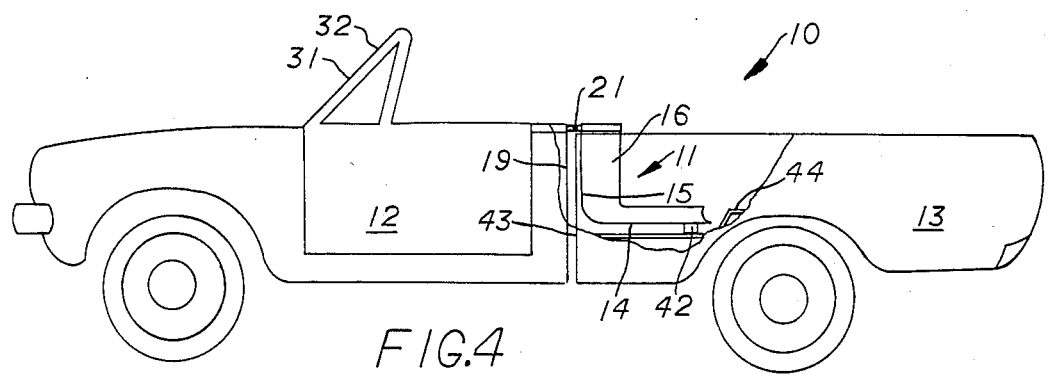
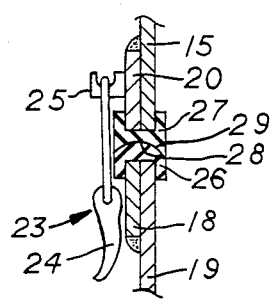
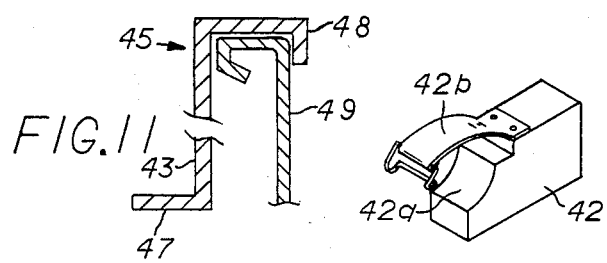
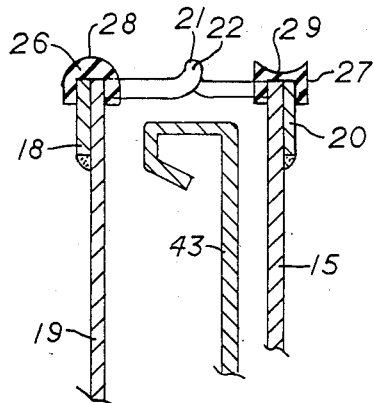
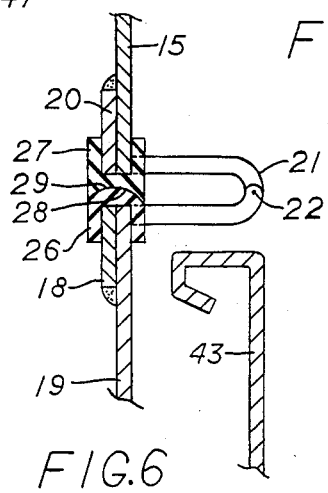
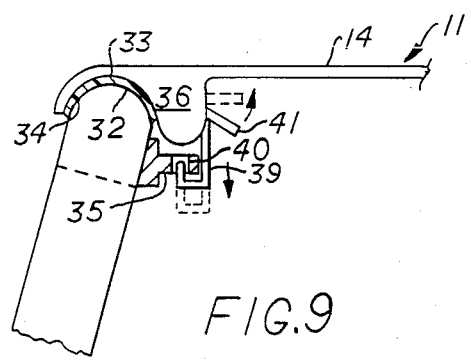
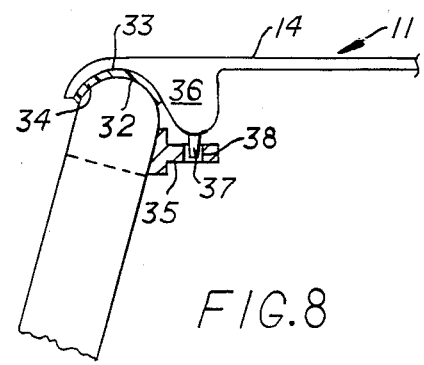

CONVERTIBLE PICKUP TRUCK

BACKGROUND OF THE INVENTION

1. Field of the Invention

This invention relates generally to convertible vehicles and tops, and more particularly to a convertible cab top for pickup truck vehicles.

2. Brief Description of the Prior Art

Convertible tops for vehicles are known in the art. There are several patents which disclose vehicle convertible tops of various construction.

Young et al, U.S. Pat. No. 3,167,349 disclosed a fabric convertible top which covert both the cab area and the bed area of a truck type vehicle and utilizes a folding inner framework.

Domina, U.S. Pat. No. 3,083,994 discloses a roof structure for tractor type vehicles which may be moved into and out of a shielding position above the drivers seat on arcuate tracks.

George, U.S. Pat. No. 2,548,105 discloses a two piece collapsible top for vehicles which moves hydraulically up and down and the roof portion moves rearwardly. To store the top, the windshield lock pins are removed, and a switch is turned to move the roof portion rearwardly and after clearing the heads of the occupants, the top is lowered to the stored position.

Atwater, U.S. Pat. No. 2,191,269 discloses a hard top for autos which telescopes into to the automobile body beneath the front seat.

Nystrom et al, U.S. Pat. No. 1,474,283 discloses a convertible top which is raised or lowered above the vehicle bed. A removable fabric cover is fastened to the forward portion of the raised bed cover and to the windshield to cover the cab area.

Ludewig, Netherland Pat. No. 40,651 discloses a convertible top cover which utilizes a folding framework with a fabric cover which is operated by a cable and pulley assembly.

The present invention is distinguished over the prior art in general, and these patents in particular by a convertible pickup truck having a lower cab portion and a bed portion with a convertible cab top pivotally mounted on the lower cab portion which is movable between a raised position covering the lower cab portion and a stored position within the truck bed behind the front wall of the bed. The cab top is releasably secured to the windshield frame in the raised position and has a roof portion extending from the windshield rearwardly and downwardly over the lower cab portion and is pivotally attached to the rear wall of the lower cab portion. Latch members at the rear portion of the cab top and the lower cab portion releasably secure the cab top to the lower cab portion in the raised position. Resilient seals between the lower cab portion, the cab top, and the windshield form a weather-tight seal between the abutting surfaces of the members in the raised position.

SUMMARY OF THE INVENTION

It is therefore an object of the present invention to provide a convertible cab top for pickup trucks.

It is another object of this invention to provide a convertible cab top for pickup trucks which will pivot rearward into the bed of the truck when it is desired to convert the truck to an open cab or roadster type of vehicle.

Another object of this invention is to provide a convertible cab top for pickup trucks in which the cab top, when withdrawn from its normal position, will result in exterior of the truck body having a neat, sleak, and unbroken appearance.

Another object of this invention is to provide a convertible cab top construction which may be quickly and easily converted from pickup truck type of construction to an open cab or roadster type of construction, or vice versa.

Another object of this invention is to provide a convertible cab top for pickup trucks which the control of the movement of the top and its storage position is simple, convenient, and reliable.

Another object of this invention is to provide a convertible cab top construction which may be quickly and easily converted from pickup truck type of construction to an open or roadster type of construction, or vice versa.

A further object of this invention is to provide a convertible cab top for pickup trucks in which the conversion may be achieved without unduly encroaching upon the occupant cab space.

A still further object of this invention is to provide a convertible cab top for pickup trucks which is simple in design, economical to manufacture, and rugged and durable in use.

Other objects of the invention will become apparent from time to time throughout the specification and claims as hereinafter related.

The above noted objects and other objects of the invention are accomplished by a convertible pickup truck having a lower cab potion and a bed portion with a convertible cab top pivotally mounted on the lower cab portion which is movable between a raised position covering the lower cab portion and a stored position within the truck bed behind the front wall of the bed. The cab top is releasably secured to the windshield frame in the raised position and has a roof portion extending from the windshield rearwardly and downwardly over the lower cab portion and is pivotally attached to the rear wall of the lower cab portion. Latch members at the rear portion of the cab top and the lower cab portion releasably secure the cab top to the lower cab portion in the raised position. Resilient seals between the lower cab portion, the cab top, and the windshield form a weather-tight seal between the abutting surfaces of the members in the raised position.

BRIEF DESCRIPTION OF THE DRAWINGS

FIG. 4 is a side elevation view of the pickup truck in partial cross section with the convertible cab top in the stored position in the pickup truck bed.

FIG. 5 is an enlarged cross section view of the hinge and seal arrangement of the convertible cab top in the stored position.

FIG. 6 is an enlarged cross section view of the hinge and seal arrangement of the convertible cab top in the raised position.

FIG. 7 is an enlarged cross section view of the rear latch and arrangement of the convertible cab top in the raised position.

FIGS. 8 and 9 are enlarged cross section views of the windshield latch and seal arrangement of the convertible cab top in the raised position.

FIG. 10 is an isometric view of a roof support block used in supporting the cab top.

FIG. 11 is an elevation view of a roof support bracket installed on the the side wall of the pickup truck.

DESCRIPTION OF THE PREFERRED EMBODIMENT

Figure 1:
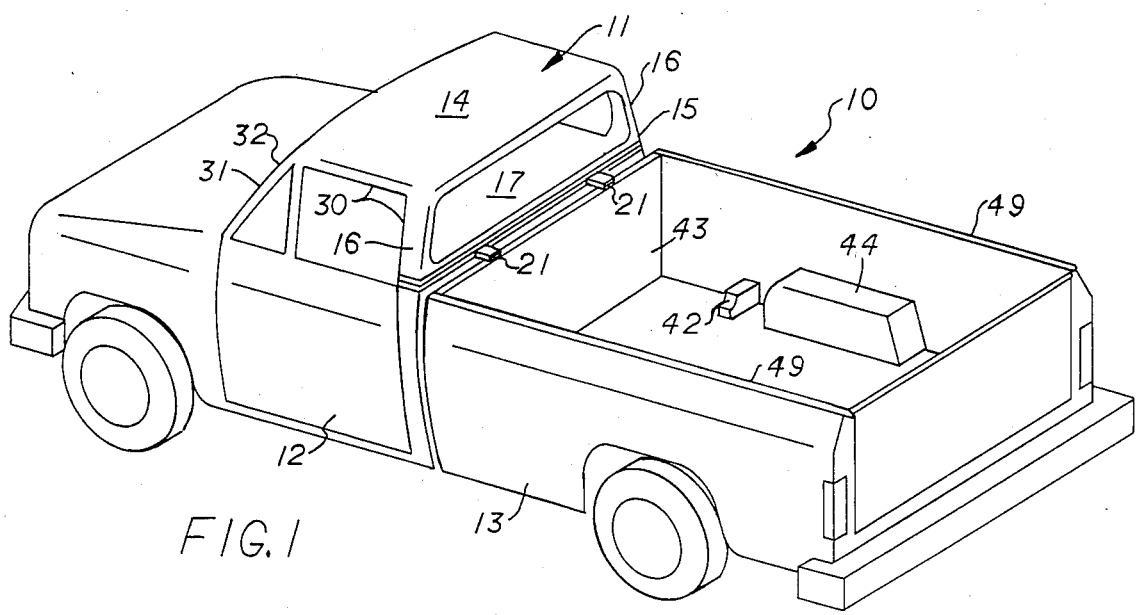
FIG. 1 is an isometric view of a pickup truck having the convertible cab top installed in the raised position covering the lower cab portion.
Figure 2:
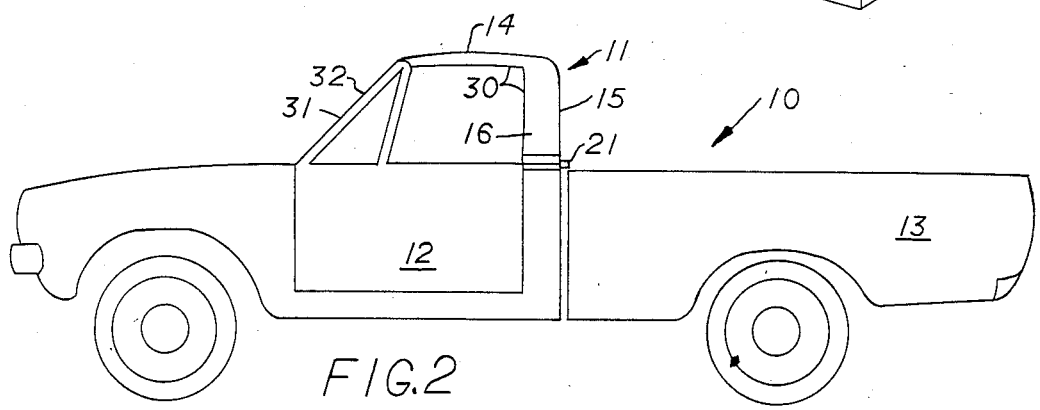
FIG. 2 is a side elevation view of the pickup truck with the convertible cab top in the raised position.
Figure 3:
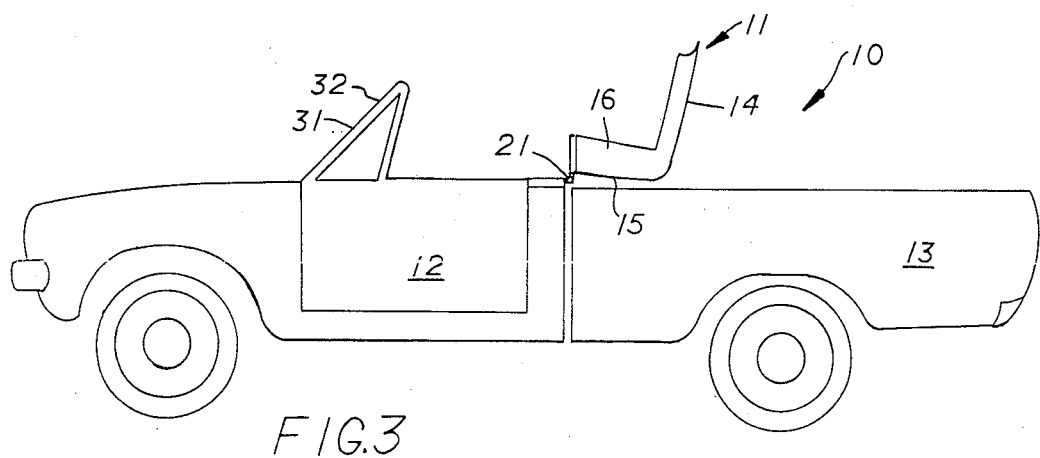
FIG. 3 is a side elevation view of the pickup truck with the convertible cab top in an intermediate position after being unfastened from the windshield and prior to being stored in the pickup truck bed.

Referring now to the drawings by numerals of reference, there is shown a pickup truck 10 having a convertible cab top 11 pivotally mounted thereon. The pickup truck body includes a lower cab portion 12 and bed 13 mounted in the usual way on the chassis. The pickup truck lower cab portion 12 and bed 13 are of sheet metal or other suitable material, and the convertible cab top 11 is substantially rigid and may be of sheet metal or other suitable material, such as fiberglass or high impact plastic.

The convertible cab top 11 comprises an integral roof potion 14, downwardly extending rear wall 15, and opposed side panels 16. The convertible cab top may be provided with a conventional rear window 17 in the rear wall 15, and also be provided with an interior lining or headliner (not shown). In the raised position, the roof portion 14 extends rearwardly from the windshield and the rear wall 15 and side panels 16 extend downwardly therefrom to cover the lower cab portion 12.

An elongate metal reinforcing strap 18 is secured to the interior rear wall 19 of the lower cab portion 12 such as by welding and follows the horizontal profile of the top edge thereof. A second metal reinforcing strap 20 is secured to the interior rear wall 15 of the convertible cab top and follows the horizontal profile of the bottom edge thereof. The straps 18 and 20 strengthen and reinforce the relatively thin walled sheet material of the hinged members and serve as a base for securing the hinge and latch hardware.

A pair of hinges 21 each have one strap element secured to the reinforcing strap 18 at the top of the rear wall 19 of the lower cab portion 12 in a laterally spaced relation, and the pivot pin portion 22 of the hinges extend rearwardly from the lower cab rear wall 19. The other mating strap portions of the hinges 21 are secured to the reinforcing strap 20 at the bottom of the convertible cab top rear wall 15. As shown in FIG. 7, a pair of latch members 23 each have one fastener element 24 secured to the interior surface of the reinforcing strap 18 laterally outward of the hinge members 21, and the other fastener portion 25 of the latch members are secured on the interior surface of the reinforcing strap 20 at the bottom of the convertible cab top rear wall 15.

A lower resilient weather seal member 26 is secured on the top edge of the rear wall 19 of the lower cab portion and reinforcing strap 18, and an upper resilient weather seal member 27 is secured to the bottom edge of the rear wall 15 of the convertible cab top and reinforcing strap 20. The preferred lower seal member 26 is an elongated strip having a transverse cross section in the form of an inverted generally U-shaped configuration with a convex top edge 28. The preferred upper seal member 27 is an elongated strip having a transverse cross section in the form of a generally U-shaped configuration with a concave top edge 29. In the closed position, the two seals 26 and 27 meet and when the latch members 23 are fastened, the seals are compressed together to form a weather-tight seal between the rear wall of the convertible cab top and the cab portion. The convex and concave surfaces 28 and 29 of the seals aid in correctly aligning the mating members as they are being closed. Although two seals are shown, it should be understood that only one seal may be used without departing from the scope of the invention. The convertible cab top 11 may also be provided with conventional window channels or guide members 30 on opposite sides which receive the cab side windows when rolled up.

The windshield 31 has a conventional glass plate which is mounted in a rectangular metal frame 32. The top edge of the rectangular windshield frame is convex in transverse cross section, and the mating front edge of the roof portion 14 of the convertible cab top is concave (33) in cross section and has a curved resilient weather seal 34. As shown in FIGS. 8 and 9, a pair of bracket members 35 ar secured to the interior surface of the windshield frame 32 near the convex top edge in a laterally spaced relation.

A pair of latch members 36 are secured to the interior surface of the roof portion 14 of the cab top 11 adjacent the concave front edge 33 and are in operative alignment with the brackets 35. The latch members 36 have a depending guide pin 37 which is recieved in an aperture 38 in the bracket 35 and a hooked clamping member 39 which is received in another aperture 40 in the bracket. The operation of the claming member 39 is manually controlled by a short handle or lever 41.

In the raised position, the concave surface 33 of the roof portion 14 is placed on the convex top surface of the windshield frame 32 and when the handle or lever 41 is pushed down to engage the clamping member 39 into the bracket aperture 40, the seal 34 is compressed to form a weather-tight seal between the roof portion 14 of the convertible cab top 11 and the windshield frame 32. It should be understood that the mating seal members 26 and 27 at the rear of the cab, and seal 34 at the windshield also prevent rattling of the adjoined members.

A pair of rectangular roof support blocks 42 (FIGS. 1 and 10) are installed at the forward end of truck bed 13 on the floor at opposite sides between the bed front wall 43 and wheel wells 44 to receive and support the roof portion 14 of the convertible cab top 11 in the stored position. Support blocks 42 are constructed of, or coated with, a soft resilient material to prevent scratching or marring the surface of the roof portion 14 and to prevent rattling of the cab top 11 in the stored position. The supporting surface of the support blocks may be contoured (42a) to fit the edge profile of the cab top and may be provided with hold down straps 42b for lashing down the cab top when supported thereon. The support blocks 42 may be removably secured on the floor of the bed, or simply placed in the receiving position when it is desired to store the convertible cab top.

Alternatively, as shown in FIG. 11, a pair of roof support brackets 45 may be used to support roof portion 14 of the convertible cab top in the stored position. Each support bracket 45 is a generally L-shaped member having an elongate vertical leg portion 46, a horizontal support portion 47 extending outwardly at the bottom thereof, and an inverted U-shaped hook portion 48 at the top which is removably received on the side wall 49 of the truck bed. The hook portions 48 of the support brackets may be placed on opposite side walls of the bed with the vertical portion 46 and the horizontal portion 47 in opposed relation inside the bed. The horizontal portion 47 is spaced a short distance above the floor of the bed to receive and support the roof portion 14 of the convertible cab top in the stored position. Support brackets 45 are coated with soft resilient material to prevent scratching or marring the roof surface 14 and to prevent rattling of the cab top in the stored position.

OPERATION

To convert the pickup truck into an open cab or roadster type of vehicle, the lever 41 is raised to disengage the clamping members 39 from the brackets 35 at the windshield and the latches 23 at the rear of the cab are unfastened. The driver or operator may then lift the front of the roof portion 14 off the windshield frame 32 and pivot the cab top 11 upward and rearwardly about the hinge pivot pins 22. Roof portion 14 will be received on the support blocks or brackets 42 or 45 generally parallel to the floor of the bed. Rear wall 15 of cab top 11 will reside generally parallel and closely adjacent the front wall 43 of the truck bed.

The pivot pin location of the hinges 21 is slightly greater than half the distance between the rear wall 19 of the lower cab portion 12 and the front wall 43 of the bed whereby the rear wall 15 of the cab top will be spaced from the front wall 43 of the bed in the stored position. In this manner, the convertible cab top 11 is easily and conveniently stored in the truck bed behind the cab area, and the pickup truck is converted to an open cab or roadster type vehicle. To secure the convertible cab top 11 in the raised position, the foregoing proceedure is reversed.

In installations on some trucks having a wide top edge on the side panels of the bed, it may be necessary to have an arcuate cut-out in the top edge near the front wall to allow clearance for the side panels 16 of the convertible cab top as it is raised or lowered.

While this invention has been described fully and completely with special emphasis upon a preferred embodiment, it should be understood that within the scope of the appended claims the invention may be practiced otherwise than as specifically decribed herein.

I claim:
1. A convertible pickup truck comprising;
a body having a windshield within a frame, a lower cab portion with a rear wall, and a bed portion including a front wall and extending rearwardly from the lower cab portion,
a convertible cab top having an integral roof portion, rear wall including a rear window, and opposed side panels of substantially rigid sheet material pivotally mounted on said lower cab portion and movable between a raised position covering said lower cab portion and a stored position within said bed rearwardly of said lower cab portion,
said cab top in the raised position releasably connected to the windshield frame and said roof portion extending from the windshield rearwardly and downwardly over the lower cab portion and pivotally attached to the rear wall of said lower cab portion,
metal reinforcing straps secured to the upper portion of the rear wall of said lower cab portion and the rear wall of said cab top to strengthen and reinforce the rear walls of said lower cab and cab top members,
a pair of hinges each having one strap element secured at the reinforced top of the rear wall of said lower cab portion and the adjoined strap elements of the hinges secured at the reinforced bottom of the rear wall of said cab top in a laterally spaced relation with hinge pins positioned rearwardly a distance from the rear wall of said lower cab portion such that backward pivoting of said cab top pivots the same into the truck bed,
resilient seal means at the forward end of the roof portion of said cab top to form a weather-tight seal between the top of the windshield frame the forward edge of said cab top in the raised position,
releasable clamping means for releasably securing the cab top to the windshield frame in the raised position including a pair of apertured bracket members secured to the interior surface of the windshield frame beneath the top edge in a laterally spaced relation, a pair of latch members secured to the interior surface of the top portion of the cab top in operative alignment with said brackets and each latch member having a guide pin adapted to be received in an aperture in said bracket, and a lever operated hooked clamping member adapted to be received in another aperture in said bracket and movable to a locked position,
a pair of releasable latch members each having one element secured near the top of the rear wall of said lower cab portion in a laterally spaced relation and the adjoining element secured near the bottom of the rear wall of said cab top to releasably secure the cab top to the lower cab portion in the raised position,
a lower resilient seal member secured to the top edge of the rear wall of said lower cab portion and an upper resilient seal member secured to bottom edge of the rear wall of said cab top to form a weather-tight seal between the abutting surfaces of the hinged members in the raised position, and
support means in said truck bed positioned in alignment to recieve and support said cab top in the stored position, the supporting surface of which is adapted to prevent scratching or marring the surface of the roof portion of said cab top when supported thereon.
2. The vehicle according to claim 1 in which said cab top comprises an integral roof portion, rear wall, and opposed side panels.
3. The vehicle according to claim 1 in which said hinge means being secured to said reinforcing means.
4. A pickup truck according to claim 1 in which said lower seal member in transverse cross section having an inverted generally U-shaped configuration with a convex top edge and said upper seal member in transverse cross section having a generally U-shaped configuration with a concave top edge,
the convex and concave surfaces of said seals nesting one on the other as said cab top is being raised to aid in correctly aligning the cab top with the lower cab portion, and
said lower and upper seal members compressed together when said cab top is in the raised position and said latch means are fastened.
5. A pickup truck according to claim 1 in which the top edge of the rectangular windshield frame is convex in transverse cross section and the front edge of the top portion of the convertible cab top is concave in transverse cross section and provided with a resilient seal carried in the concave surface.

6. A pickup truck according to claim 1 in which said support means comprises a pair of rectangular blocks installed at the forward end of the truck bed on the floor on opposite sides between the front wall of the bed and the wheel wells, said blocks constructed of resilient material to prevent scratching or marring the surface of the roof portion of said cab top and to prevent rattling of said top in the stored position.

7. A pickup truck according to claim 1 in which said support means comprises a pair of generally L-shaped bracket member each having a hooked top portion suspended from opposite side walls of the truck bed and a horizontal support portion extending outwardly at the bottom thereof in opposed relation inside the bed and spaced a short distance above the floor of the bed to receive and support the roof portion of said cab top in the stored position.

* * * * *